(12) United States Patent
Pfunder et al.

(10) Patent No.: US 10,966,077 B2
(45) Date of Patent: Mar. 30, 2021

(54) COMMUNICATING EMERGENCY INFORMATION VIA A BEACON

(71) Applicant: Schlage Lock Company LLC, Carmel, IN (US)

(72) Inventors: Dan Pfunder, Noblesville, IN (US); Joseph W. Baumgarte, Carmel, IN (US)

(73) Assignee: Schlage Lock Company LLC, Carmel, IN (US)

( * ) Notice: Subject to any disclaimer, the term of this patent is extended or adjusted under 35 U.S.C. 154(b) by 102 days.

(21) Appl. No.: 16/145,531

(22) Filed: Sep. 28, 2018

(65) Prior Publication Data

US 2019/0104394 A1    Apr. 4, 2019

Related U.S. Application Data

(60) Provisional application No. 62/565,694, filed on Sep. 29, 2017.

(51) Int. Cl.
  *H04W 4/90* (2018.01)
  *G08B 21/02* (2006.01)
  (Continued)

(52) U.S. Cl.
  CPC ............. *H04W 4/90* (2018.02); *G08B 7/066* (2013.01); *G08B 21/02* (2013.01); *G08B 27/00* (2013.01);
  (Continued)

(58) Field of Classification Search
  CPC ........ H04W 4/90; H04W 4/024; G08B 21/02; G08B 27/00
  See application file for complete search history.

(56) References Cited

U.S. PATENT DOCUMENTS

2008/0311870 A1  12/2008  Walley et al.
2011/0136463 A1   6/2011  Ebdon et al.
(Continued)

OTHER PUBLICATIONS

International Search Report; International Searching Authority; International Patent Application No. PCT/US2018/053733; dated Dec. 20, 2018; 2 pages.
(Continued)

*Primary Examiner* — Curtis B Odom
(74) *Attorney, Agent, or Firm* — Taft Stettinius & Hollister LLP

(57) ABSTRACT

Systems and methods include communicating emergency information relative to a structure and an individual associated with the structure. Embodiments of the present disclosure relate to a beacon that transmits emergency information to a communications device associated with the individual. The emergency information includes emergency status information that updates the individual as to a status of an emergency that the structure is enduring and/or emergency action information that provides recommended actions for the individual to execute to avoid harm caused by the emergency. A controller updates the emergency information that is transmitted by the beacon based on changes in the status information due to changes in the status of the emergency that the structure is enduring and/or changes in the emergency action information due to changes in the recommended actions that the individual is to execute based on changes in the status information of the emergency.

21 Claims, 3 Drawing Sheets

(51) Int. Cl.
  *H04W 4/024* (2018.01)
  *G08B 7/06* (2006.01)
  *G08B 27/00* (2006.01)
  *H04W 4/80* (2018.01)
  *H04W 4/02* (2018.01)

(52) U.S. Cl.
  CPC ......... *H04W 4/024* (2018.02); *G08B 21/0272* (2013.01); *H04W 4/02* (2013.01); *H04W 4/027* (2013.01); *H04W 4/80* (2018.02)

(56) References Cited

U.S. PATENT DOCUMENTS

2017/0156042 A1* 6/2017 Kwan .................... H04W 76/14
2017/0171754 A1* 6/2017 South .................... H04W 4/029

OTHER PUBLICATIONS

Written Opinion; International Searching Authority; International Patent Application No. PCT/US2018/053733; dated Dec. 20, 2018; 12 pages.

* cited by examiner

COMMUNICATING EMERGENCY INFORMATION VIA A BEACON

CROSS-REFERENCE TO RELATED APPLICATIONS

The present application claims the benefit of U.S. Provisional Application No. 62/565,694 filed Sep. 29, 2017, the contents of which are incorporated herein by reference in their entirety.

BACKGROUND

Different types of structures, such as commercial buildings, have a flow of occupants that pass through and/or occupy the structure and oftentimes such structures have a complicated layout of egress paths that include entrances, exits, stairwells, elevators, safe areas to congregate during an emergency and so on that may be implemented in emergency situations by those that are occupying the structure. However, some egress paths may be less impacted by the elements of the emergency than others and thus are more preferable to individuals attempting to avoid harm from the emergency than those that are more impacted.

Conventionally, occupants are notified as to a location of an egress path based on immobilized indicators that are positioned at the location of the egress path. For example, an egress path is typically identified to occupants based on a static sign, such as an "EXIT" sign that is positioned at the entrance of the egress path. Occupants may only be aware of the egress path when within sufficient proximity to recognize the egress identification. Occupants that are positioned outside the proximity of egress identification may simply be unaware of the presence of other egress paths. Further, egress paths may have an increased risk of harm based on the impact of the emergency. Occupants may be unaware of the increased risk of harm present in specific egress paths as compared to others. Thus, the communication as to the presence of egress paths as well as additional information as to the status of the egress paths relative to the emergency is instrumental in guiding occupants to safety.

BRIEF SUMMARY

Embodiments of the present disclosure relate to communicating to individuals, such as occupants, emergency information associated with an emergency that a structure, such as a commercial building, is enduring and is updated based on changes in the status of the emergency such that individuals may avoid harm from the emergency. In an embodiment, a system may be implemented that communicates emergency information relative to a structure to an individual associated with the structure. A beacon is configured to transmit emergency information to a communications device associated with the individual. The emergency information includes emergency status information that updates the individual as to a status of an emergency that the structure is enduring and/or emergency action information that provides recommended actions for the individual to execute to avoid harm caused by the emergency. A controller is configured to update the emergency information that is transmitted by the beacon based on changes in the status information due to changes in the status of the emergency that the structure is enduring and/or changes in the emergency action information due to changes in the recommended actions that the individual is to execute based on changes in the status information of the emergency.

In an embodiment, a method communicates emergency information relative to a structure to an individual associated with the structure. Emergency information is transmitted by a beacon to a communications device associated with the individual. The emergency information includes emergency status information that updates the individual as to a status of an emergency that the structure is enduring and/or emergency action information that provides recommended actions for the individual to execute to avoid harm caused by the emergency. The emergency information that is transmitted by the beacon may be updated based on changes in the status information due to changes in the status of the emergency that the structure is enduring and/or changes in the emergency action information due to changes in the recommended actions that the individual is to execute based on changes in the status information of the emergency.

In an embodiment, a system may be implemented to communicate emergency information relative to a structure between a beacon associated with the structure and an individual that is associated with the structure. A communications device that is associated with the individual is configured to receive emergency information from the beacon. The emergency information includes emergency status information that updates the individual as to a status of an emergency that the structure is enduring and/or emergency action information that provides recommended actions for the individual to execute to avoid harm caused by the emergency. A controller is configured to query an emergency server to obtain detailed emergency information. The detailed emergency information provides additional information associated with the status of the emergency that the structure is enduring and/or additional information associated with the recommended actions for the individual to execute to avoid harm caused by the emergency that is in addition to the emergency information received from the beacon.

In an embodiment, a method communicates emergency information relative to a structure between a beacon associated with the structure and an individual that is associated with the structure. A communications device that is associated with the individual receives emergency information from the beacon. The emergency information includes emergency status information that updates the individual as to a status of an emergency that the structure is enduring and/or emergency action information that provides recommended actions for the individual to execute to avoid harm caused by the emergency. An emergency server may be queried to obtain detailed emergency information. The detailed emergency information provides additional information associated with the status of the emergency that the structure is enduring and/or additional information associated with the recommend actions for the individual to execute to avoid harm caused by the emergency that is in addition to the emergency information received from the beacon.

In an embodiment, a system may be implemented to communicate emergency information relative to an individual associated with the structure. An access control device is configured to execute an action to regulate access to a space included in the structure. At least one component associated with the access control device is configured to detect data associated with the space included in the structure. A beacon associated with the access control device is configured to transmit emergency information to a communications device associated with the individual. The emergency information includes emergency status information that updates the information as to a status of an emergency that the structure is enduring and/or emergency action information that provides recommended actions for the individual to execute to avoid harm caused by the emergency. A controller is configured to instruct the access control device to execute the action based on the data detected by the at least one component to regulate the space. The controller is also configured to update the emergency information that is transmitted by the beacon based on changes in the status information due to changes in the status of the emergency that the structure is enduring and/or changes in the emergency action information due to changes in the recommended actions that the individual is to execute based on changes in the status information of the emergency.

BRIEF DESCRIPTION OF THE DRAWINGS

Embodiments are described with reference to the accompanying drawings. In the drawings, like reference numbers may indicate identical or functionally similar elements.

DETAILED DESCRIPTION

Figure 1:
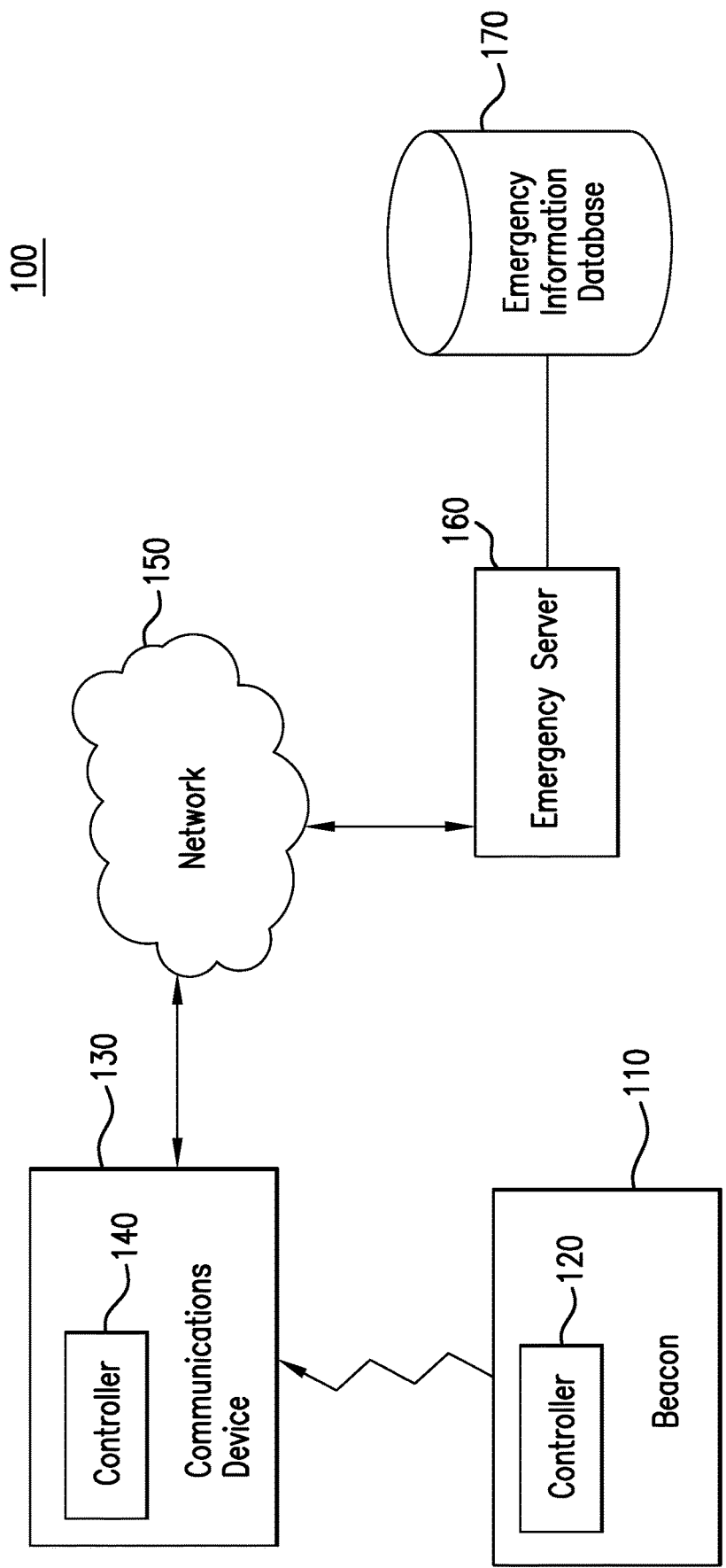
FIG. 1 shows an illustration of an emergency information generating system.

Embodiments of the disclosure generally relate to conveying emergency information relative to an emergency that a structure, such as a commercial building, is enduring to occupants as well as emergency responders to assist the occupants in avoiding harm caused by the emergency. In an example embodiment, a beacon that is associated with the structure, such as a beacon associated with an egress path, may transmit emergency information to a communications device associated with the individual. The emergency information may update the individual as to a status of the emergency, such as a fire is present in a specified portion of the structure as well as recommended actions for the individual to execute, such as avoiding a specific stairwell due to the presence of fire in the stairwell. The emergency information transmitted by the beacon may be updated based on changes in the status of the emergency, such as the fire has now spread to additional portions of the structure. The emergency information transmitted by the beacon may also update the recommended actions that the individual is to execute based on changes in the status of the emergency, such as the elevators are no longer a safe egress path due to the presence of fire in the elevator shafts.

In addition to receiving the emergency information from the beacon as well as any updates in the emergency information, the communications device associated with the individual may also query an emergency server to obtain detailed emergency information associated with the emergency. The amount of emergency information that the beacon may transmit to the communications device may be limited and may thus be brief and direct as to the status of the emergency as well as the recommended actions for the individual to execute. However, the detailed emergency information provided by the emergency server may provide significantly more detailed emergency information such as providing a map of the structure that includes each of the egress paths so that the individual may more easily navigate through the structure in order to locate and reach the safest egress paths in order for the individual to avoid harm caused by the emergency.

In the Detailed Description herein, references to "one embodiment", "an embodiment," an "example embodiment", etc., indicate that the embodiment described may include a particular feature, structure, or characteristic, by every embodiment may not necessarily include the particular feature, structure, or characteristic. Moreover, such phrases are not necessarily referring to the same embodiment. Further, when a particular feature, structure, or characteristic may be described in connection with an embodiment, it may be submitted that it may be within the knowledge of one skilled in the art to affect such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

The following Detailed Description refers to the accompanying drawings that illustrate exemplary embodiments. Other embodiments are possible, and modifications can be made to the embodiments within the scope of this description. Those skilled in the art with access to the teachings provided herein will recognize additional modifications, and embodiments within the scope of thereof and additional fields in which embodiments would be of significant utility. Therefore, the Detailed Description is not meant to limit the embodiments described below.

Overview

As shown in FIG. 1, an emergency information generating system 100 includes a beacon 110, a communications device 130, an emergency server 160, a network 150, and an emergency information database 170. Beacon 110 includes a controller 120. Communications device 130 includes a controller 140.

The beacon 110 and the communications device 130 may engage in wireless communication, such as but not limited to Bluetooth (e.g., Bluetooth low energy (BLE)) to alert occupants and/or emergency responders toward egress paths that are safe and enable the occupants and/or emergency responders to avoid harm from an emergency that the structure is enduring. The structure may be occupied by individuals, such as a commercial building and/or airport, and may be exposed to emergencies, such as a fire, that may harm individuals. For example, the beacon 110 may alert the individuals associated with the structure as to a variety of conditions that include but are not limited to the identification and/or location of free-egress doors, stairwells, and/or tornado shelter spaces. The beacon 110 may be stand-alone and/or integrated into access control devices such as but not limited to locks, strikes, readers, and exit devices.

The beacon 110 may communicate the emergency information to the communications device 140 within the advertising packet of the BLE and/or other wireless protocols to identify to the communications device 130 the appropriate egress paths that if located may prevent the individual from enduring harm from the emergency. For example, the beacon 110 may communicate to the communications device that specific stairwells are blocked above and/or below by fire and/or other debris conditions and are not passable and should be avoided to in order to prevent enduring harm.

The communications device 130 may include but is not limited a smartphone, a wearable device such as a smartwatch, and/or any other type of communications device that includes a controller 140. The controller 140 may provide the emergency information provided by the beacon 110 to provide additional information as to the quantity/location of spaces and/or egress paths that may be available in the structure for the individuals to avoid harm from the emergency based on the current status of the emergency. The controller 140 may assess the strength of the signal generated by the beacon 110 to direct the individuals to the appropriate egress paths and/or spaces to avoid harm from the emergency. Thus, the individuals are not required to have prior knowledge of the layout of the structure and/or of the location of each of the egress paths and/or spaces.

Beacon Overview

As noted above, emergency information generating system 100 may communicate emergency information relative to a structure to an individual associated with the structure. Beacon 110 may transmit emergency information to communications device 130. Communications device 130 may be associated with the individual such that the individual may easily engage communications device 130 to obtain the emergency information transmitted by beacon 110. The emergency information may include emergency status information that updates the individual as to a status of an emergency that the structure is enduring and/or emergency action information that provides recommended actions for the individual to execute to avoid harm caused by the emergency. Beacon 110 may include controller 120. Controller 120 may update the emergency information that is transmitted by beacon 110 based on changes in the status information due to changes in the status of the emergency that the structure is enduring and/or changes in the emergency action information due to changes in the recommended actions that the individual is to execute based on changes in the status information of the emergency. The recommended actions are actions recommended by a third party, such as a central command, as to the actions that the individual is to execute to avoid harm caused by the emergency. Beacon 110 may engage in one-directional communication with communications device 130 where beacon 110 transmits the emergency information to communications device 130.

Controller 120 may transition from transmitting a first packet of information to transmitting a second packet of emergency information to communications device 130 that is associated with the individual. In doing so, controller 120 may transition between transmitting the first packet of information to a second packet of emergency information when information initially conveyed in the first packet to communications device 130 is changed due to a change in the emergency information associated with the structure. The transition of the first packet of information to transmitting the second packet of emergency information by controller 120 may update the individual as to the status of the emergency that the structure is enduring and/or the emergency action information recommended from the individual via communications device 130.

For example, controller 120 may initially instruct beacon 110 to transmit a first packet that includes information that each of the egress paths are available and operational and there are no current emergencies that the structure is enduring. However, after a tornado warning is received by the National Weather Server, for example, controller 120 may transition beacon 110 from transmitting the first packet of information indicating that all egress paths are available and operational and no current emergencies exist to transmitting the second packet of information indicating that the structure is enduring a tornado warning and indicating the space that is safe to shield the individual from harm endured by the incoming tornado.

In an embodiment, a central command that is evaluating the status of the structure regarding emergencies in real-time may update the controller 120 as to the packet of emergency information that is to be transmitted by beacon 110 to communications device 130 such that the individual may be updated as to the change in the emergency information based on the status of the emergency and/or the recommended actions for the individual to execute. Real-time is the status of the structure regarding emergences as evaluated by the central command. The central command may be an evaluation system and/or group of individuals that are evaluating the status of the structure regarding emergencies in real-time such that as the status changes the central command may identify the change in status. The central command may obtain changes in the status of the emergency in real-time and determine the appropriate recommended actions for the individual to execute such that the individual is updated in real-time as any adjustment in the recommended actions.

For example, an explosion that impacts the structure may be monitored in real-time by the central command. The central command may monitor the status of the explosion such as but not limited to fires triggered by the explosion as well as fallen debris in real-time. The central command may then evaluate in real-time the specific stairwells that are safe for the individual to enter due to the lack of fire and/or debris blocking the stairwells as well as specific stairwells that are not safe for the individual to engage due to the presence of fire and/or debris blocking the stairwells. The central command may monitor each of the stairwells and update the individual in real-time by updating controller 120 as to the updated packet of emergency information that beacon 110 is to transmit to communications device 130 such that the individual is updated in real-time as to any change in stairwells that are no longer safe to follow to avoid enduring harm from the explosion to the structure.

Beacon 110 may transmit a prompt included in the emergency information transmitted to communications device 130 that requests the individual to provide individual emergency status information to emergency server 160 via communications device 130 (e.g., by transmitting such data over a suitable network 150). The individual emergency status information is status information associated with the individual as the individual endures the emergency that the structure is enduring. For example, central command may identify an active shooter in the structure and update controller 120 to transition beacon 110 from transmitting the first packet indicating that the structure was not enduring any emergencies to transmitting the second packet indicating that an active shooter is present in the structure. The second packet transmitted by beacon 110 indicating the presence of an active shooter in the structure may also prompt the individual to stay in his or her current location and acknowledge via communications device 130 the current location of the individual and that the individual is not currently harmed. Communications device 130 may provide this individual emergency status information to emergency server 160 such that such emergency status information may be accessed by central command. Central command may then communicate to the emergency responders as to the current location of the individual as well as that the individual is not currently harmed.

Controller 120 may generate detailed emergency information and provide the detailed emergency information to emergency server 160. The detailed emergency information may provide additional information associated with the status of the emergency that the structure is enduring and/or additional information associated with the recommended actions for the individual to execute to avoid harm caused by the emergency that is in addition to the emergency information transmitted by beacon 110.

Controller 120 may generate additional information that may assist the individual in reaching the appropriate egress path and/or space to avoid enduring harm from the emergency by providing the additional information to emergency server 160. Controller 140 of communications device 130 may then query emergency server 160 to receive the additional information and display the additional information to the individual such that the individual may incorporate the additional information in attempting to reach the appropriate egress path and/or space.

For example, controller 120 may update the packet transmitted by beacon 110 to transmit emergency information that identifies a tornado warning has been received from the National Weather Service and specific one or more spaces within the structure, such as the basement, should be accessed by the individual to avoid harm from the tornado warning. Further, controller 120 may supplement the packet of emergency information transmitted by beacon 110 with detailed emergency information that is provided to emergency server 160 such as directions as to how the individual may reach the basement. Controller 140 of communications device 130 may access the detailed emergency information from emergency server 160 via network 150.

Beacon 110 may transmit default emergency information associated with the transmitted emergency information to communications device 130. The default emergency information and the emergency information may be included in a packet of information transmitted to communications device 130 and provides additional information as related to the emergency that the structure is enduring to the individual when communications device 130 is unable to access emergency server 160 via network 150 to receive the updated detailed emergency information stored in emergency server 160.

There may be instances when communications device 130 may not be able to access emergency server 160 via network 150 and thereby may not be able to receive the detailed emergency information that is associated with the emergency information transmitted by beacon 110. The emergency information as well as the default emergency information may be transmitted by beacon 110 based on the data fields of the advertising packet that is updated by controller 120 with the appropriate emergency information as well as the default emergency information. Each of the codes (e.g., byte codes) included in the advertising field by controller 120 may be defined with the corresponding emergency information and the default emergency information.

For example, communications device 130 may not be able to access emergency server 160 via network 150 due to the damage caused by a tornado that is approaching the structure. Controller 120 may update the packet transmitted by beacon 110 to include emergency information that states that a tornado warning has been received from the National Weather Service. Despite communications device 130 not able to access emergency server 160 to obtain detailed emergency information such as the directions to the closest space from the current location of the individual in the structure, controller 120 may update the packet transmitted by beacon 110 to list each space that is an interior room with no windows included in the structure. The individual may then have some additional information as to at least the spaces in the structure that are interior rooms with no windows and may attempt to locate those spaces despite not having directions provided by emergency server 160 to the closest space to the current location of the individual.

The central command may also update the packets transmitted by beacon 110 to include updated default emergency information. Despite communications device 130 not able to access emergency server 160 to obtain detailed emergency information, the central command may update the packet transmitted by beacon 110 to provide updated default emergency information to the individual. For example, central command may update the packet transmitted by beacon 110 to included updated default emergency information that specific stairwells are no longer accessible to the individual due to fires that have ignited due to the tornado. Rather than the individual not being able to receive such updated information due to communications device 130 not being able to access emergency server 160 via network 150, the central command may identify that fires now exist in specific stairwells and update the packet transmitted by beacon 110 to include updated default emergency information indicating to the individual that the specific stairwells should be avoided to avoid harm. As such, it should be appreciated that the beacons 110 may form a portion of an alternative communication system to convey relevant emergency information.

Beacon 110 may be associated with a plurality of components or sensors where each component may detect data associated with the environment surrounding beacon 110. For example, the plurality of components may include but is not limited to temperature sensors, accelerometers, mangetometers, gyroscopes, and/or any other type of data detection device that may provide sufficient data to controller 120 as to the environment surrounding beacon 110. Controller 120 may then incorporate the data captured by the components and update the packet transmitted by beacon 110 to include updated emergency information that is associated with the data captured by the components.

For example, the temperature sensors associated with beacon 110 may detect a temperature associated with the environment surrounding beacon 110 has increased above a threshold indicating that the temperature associated with the environment surrounding beacon 110 is uncharacteristically hot. In such an example, beacon 110 may be positioned in a stairwell. Controller 120 may assess that the temperature detected by the component having increased significantly above the threshold may be indicative that a fire is now present in the stairwell and that the stairwell should be avoided. Controller 120 may then update the packet of emergency information transmitted by beacon 110 to transition from the stairwell is passable and no emergency exists to a fire may likely be present in the stairwell and the stairwell should be avoided. Beacon 110 may then transmit the updated emergency information to communications device 130 such the individual is aware to avoid the stairwell due to the risk that a fire may be present in the stairwell.

Each of the other controllers corresponding to each of the other beacons positioned in the stairwell that has triggered controller 120 to indicate a possible fire located in the stairwell may be updated to update the packet of emergency information transmitted by the corresponding beacons to also indicate a possible presence of fire in the stairwell and the fire should be avoided. Despite the temperature sensors associated with each of the other beacons in the stairwell not yet detecting temperatures that exceed the threshold, each of the other controllers may update the packets of emergency information to be transmitted by the other beacons located in the stairwell to warn of a danger of fire located in the stairwell due the temperature sensor of the initial beacon detecting a temperature increase that significantly exceeds the threshold indicating a significant likelihood of a fire in the stairwell.

The particular sensors associated with the beacon 110 may vary depending on the particular embodiment. For example, in various embodiments, the sensors may be embodied as, or otherwise include, proximity sensors, optical sensors, light sensors, electromagnetic sensors, hall effect sensors, audio sensors, temperature sensors, motion sensor, piezoelectric sensors, cameras, door sensors (e.g., latchbolt sensors, door position sensors (DPS), request-to-exit (REX) sensors, trim sensors, tamper sensors, etc.), environment sensors, inertial sensors, and/or other types of sensors. Of course, the beacon 110 may be associated with additional or alternative sensors in other embodiments.

Communications Device Overview

As noted above, emergency information generating system 100 may communicate emergency information relative to a structure between a beacon associated with the structure and an individual that is associated with the structure. Communications device 130 that is associated with the individual may receive emergency information from beacon 110. Controller 140 may query emergency server 160 to obtain detailed emergency information. The detailed emergency information may provide additional information associated with the status of the emergency that the structure is enduring and/or additional information associated with the recommended actions for the individual to execute to avoid harm caused by the emergency that is in addition to the emergency information received from the beacon.

Controller 140 may generate individual status information that is transmitted to emergency server 160 via communications device 130. The individual emergency status information is status information associated with the individual as the individual endures the emergency that the structure is enduring. The individual emergency status information as stored by emergency server 160 may be accessible to individuals, such as emergency responders, in order for the emergency responders to have information regarding the individuals occupying the structure. Such individual emergency status information that is available to the emergency responders may expedite the efforts of emergency responders in rescuing the individuals occupying the structure in understanding the real-time location of the individuals as well as the health status of the individuals such that the emergency responders may be prepared to provide the appropriate medical care upon arrival of the location of the individuals.

Further, the emergency status information as stored by emergency server 160 may be accessible to central command. Central command may then be able to update the detailed emergency information stored by emergency server 160 to account for the emergency status information provided to emergency server 160 by controller 140. In doing so, central command may be able to tailor the detailed emergency information based on the updated emergency status information such that the central command may be able to provide the appropriate detailed emergency information to the individual via emergency server 160.

For example, the individual may be a student located within a school. Initially, controller 120 may update the packet generated by beacon 110 to include an alert that an active shooter is located in the school. Controller 120 may then generate updated detailed emergency information as to the location in real-time of the shooter and instructing the individual as to the location of a space in the school that the individual should retreat to. Controller 140 may then generate emergency status information as to the location of the individual as well as the quantity of other individuals located with the individual as well as the health status of the individuals and provide such emergency status information to emergency server 160. Central command may then generate updated detailed emergency information as stored by emergency server 160 instructing the individual that the shooter is currently outside the room that the individual is currently located and should not move and/or make any noise.

Communications device 130 may receive a plurality of location signals generated by a plurality of beacons (not shown) associated with the structure. Each of the location signals may provide a corresponding transmit power level to communications device 130 that is relative to a corresponding distance from the communications device 130 that each beacon is located. Controller 140 may assess each of the transmit power levels provided by each of the location signals received from each of the corresponding beacons. Controller 140 may determine a direction and distance of each beacon relative to a location of communications device 130 based on each of the transmit power levels provided by each of the corresponding location signals. Controller 140 may generate an estimated location of communications device 130 relative to the structure based on each of the location signals generated by each of the corresponding beacons. Controller 140 may update the estimated location of communications device 130 as the location of communications device 130 changes relative to each of the beacons associated with the structure based on each adjusted transmit power level provided by each of the location signals.

Beacon 110 may provide a proximity that communications device 130 is located relative to beacon 110. In doing so, beacon 110 may generate the transmit power level of the location signal generated by beacon 110. Controller 140 may then determine the received power level of the location signal and determine based on the difference between the transmit power level of the location signal as transmitted by beacon 110 to the received power level of the location signal as received by communications device 130 to determine a range that communications device 130 is located relative to beacon 110. Controller 140 may then determine the received power level of various other location signals as generated by various other beacons. Controller 140 may then determine the received power level of the location signal and determine based on the differences between the various other transmit power levels of the various other locations signals as transmitted by the various other beacons to the various received power levels of the various location signals as received by communications device 130. In doing so, controller 140 may determine the various ranges that communications device 130 is located relative to the various beacons and further strengthen the location determination of communications device 130 relative to the structure.

It should be appreciated that each of the controller 120 of beacon 110, controller 140 of communications device 130, and emergency server 160 may be embodied as a computing device similar to the computing device 200 described below in reference to FIG. 2. For example, in the illustrative embodiment, each of controller 120 of beacon 110, controller 140 of communications device 130, and emergency server 160 includes a processing device 202 and a memory 206 having stored thereon operating logic 208 for execution by the processing device 202 for operation of the corresponding device.

System Overview

Figure 2:
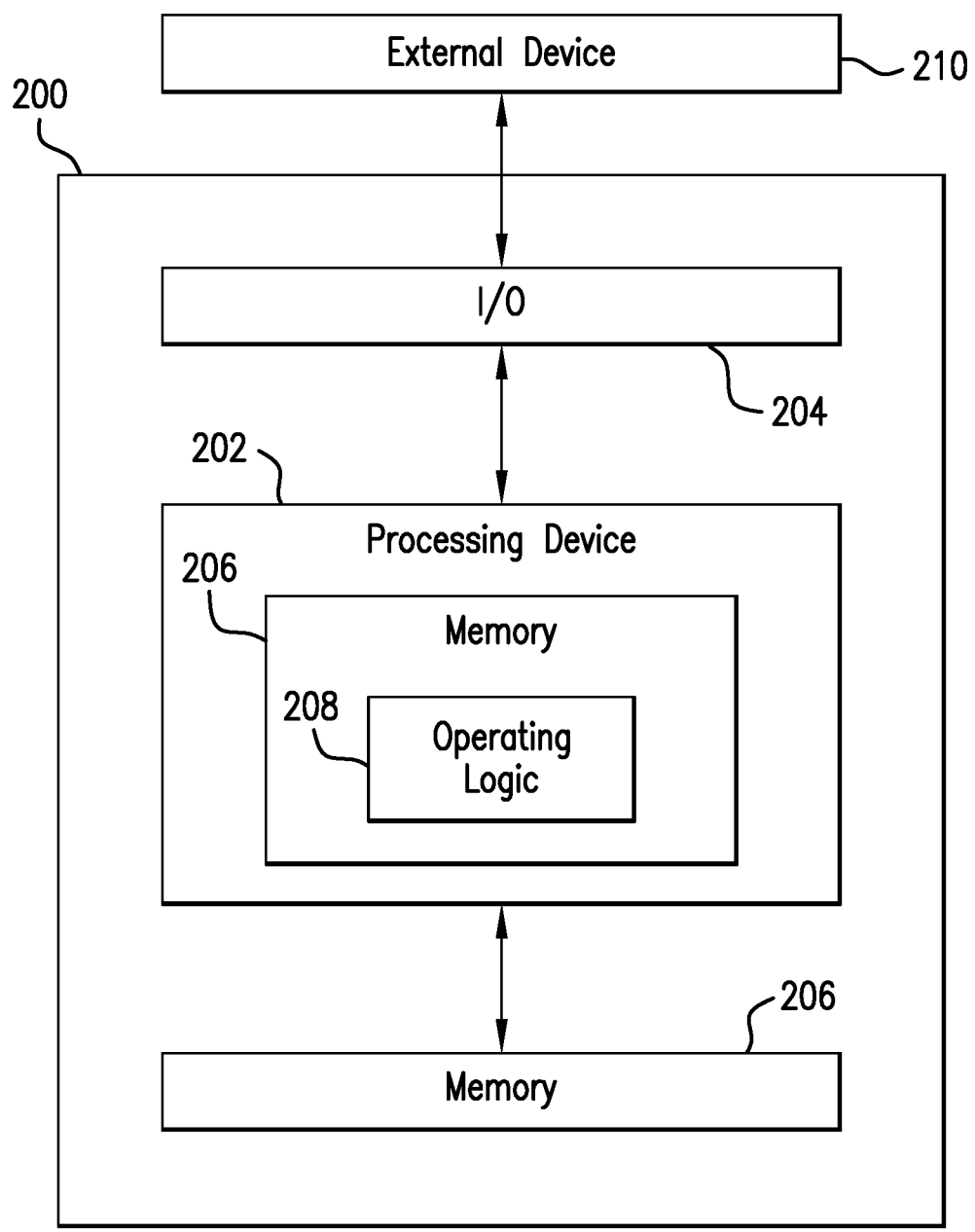
FIG. 2 depicts a simplified block diagram of a computing device.

Referring now to FIG. 2, a simplified block diagram of at least one embodiment of a computing device 200 is shown. The illustrative computing device 200 depicts at least one embodiment of a controller for a beacon, a controller for a communications device, and/or an emergency server may be utilized in connection with controller 120 of beacon 110, controller 140 of communications device 130, and/or emergency server 160 illustrated in FIG. 1. Depending on the particular embodiment, computing device 200 may be embodied as a reader device, credential device, access control device, server, desktop computer, laptop computer, tablet computer, notebook, netbook, Ultrabook™, mobile computing device, cellular phone, smartphone, wearable computing device, personal digital assistant, Internet of Things (IoT) device, control panel, processing system, router, gateway, and/or any other computing, processing, and/or communications device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as controller 120 of beacon 110, controller 140 of communications device 130, and/or emergency server 160. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communications device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is of a programmable variety that executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable variety, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Access Control Device System Overview

Figure 3:
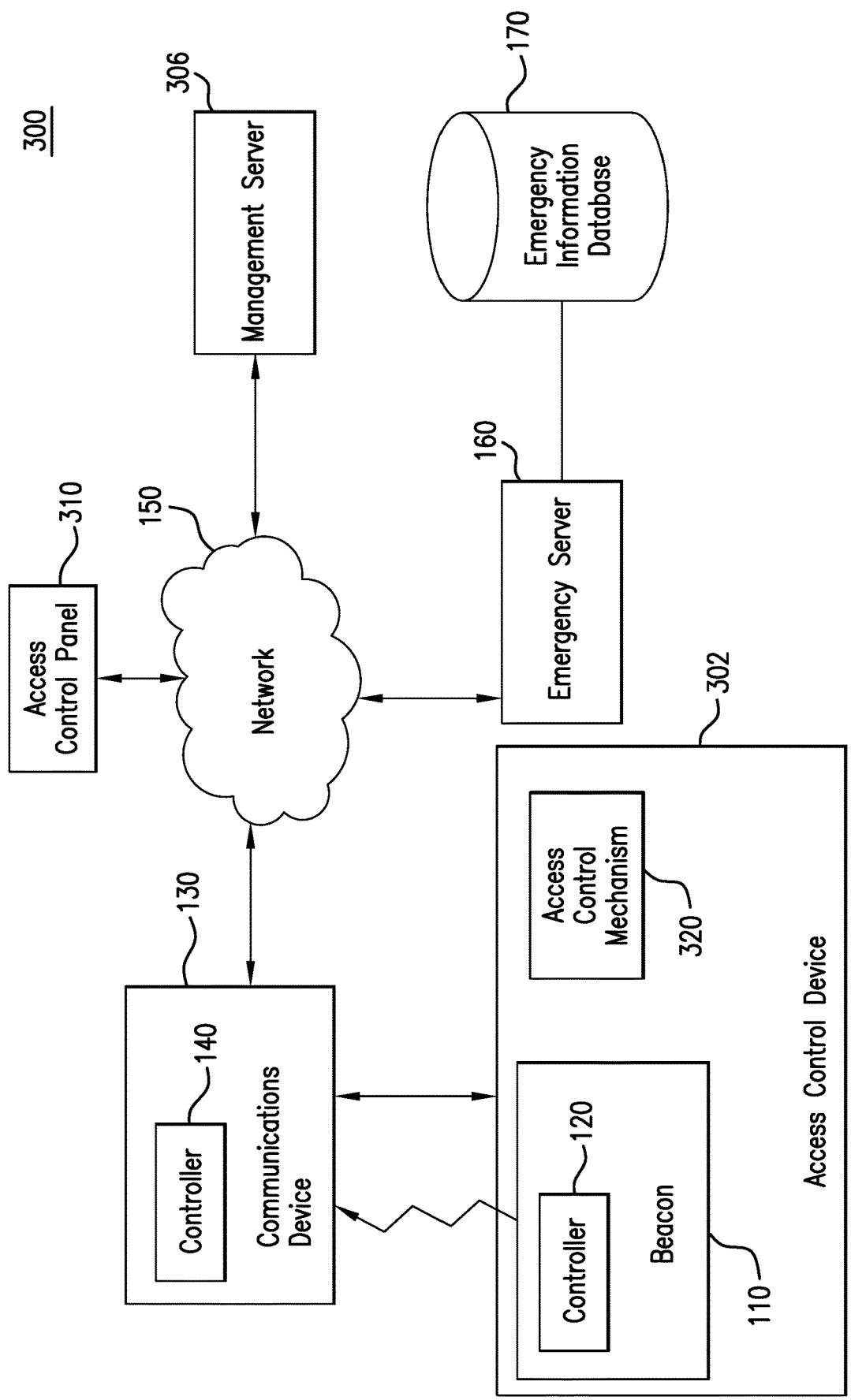
FIG. 3 shows an illustration of an emergency information generating system that may communicate emergency information relative to an individual associated with the structure.

As shown in FIG. 3, emergency information generating system 300 may communicate emergency information relative to an individual associated with the structure. An emergency information generating system 300 includes the access control device 302 and a communications device 130. Emergency information generating system 300 may also include a management server 306, a network 150 and/or an access control panel 310.

Emergency information generating system 300 may include access control device 302 for security applications regarding regulating access to a space included in the structure. Access control device 302 may indicate the status of access control mechanism 320 associated with access control device 302 as well as individuals positioned in the structure. Emergency information generating system 300 may improve communication to emergency responders so individuals occupying the structure by incorporating the access control device 302.

Access control device 320 may be positioned in numerous locations throughout the structure. Access control device 320 may include beacon 110 that may be able to direct individuals occupying the structure during an emergency. Beacon 110 may incorporate the same wireless technology, such as Bluetooth, also incorporated into access control device 320.

Emergency information generating system 300 may incorporate the emergency information generating configurations discussed in detail above. For example, emergency information generating system 300 may incorporate emergency information generating system 100 into emergency information generating system 300. Access control device 302 may act as the controller for but is not limited to door closers, door operators, auto-operators, credential readers, hotspot readers, electronic locks including mortise, cylindrical and/or tabular locks, exit devices, panic bars, wireless reader interfaces, gateway devices, plug-in devices, peripheral devices, doorbell camera systems, access control surveillance systems and/or any other type of access control device that regulates access to a space that will be apparent those skilled in the relevant art(s) without departing from the spirit and scope of the disclosure.

Access control device 302 may control one or more components of access control device 302 such as but not limited to, extending/retracting a door latch, engaging/disengaging a dogging mechanism on an exit device, opening/closing a door via a door closer/operator, moving a primer mover, controlling an electric motor, and/or any other type of action that enables access control device 302 to regulate access to a space that will be apparent those skilled in the relevant art(s) without departing from the spirit and scope of the disclosure.

Access control device 302 may be positioned in numerous locations throughout the building where access to a space may be regulated by access control device 302. By incorporating beacon 110 into each access control device 302, emergency information may be conveyed to the individual by beacon 110 with regard to each access control device 302 positioned in each of the numerous locations throughout the building where access to a space may be regulated. Thus, the individual may receive a comprehensive understanding of the status as well as the recommended actions for the individual to execute in avoiding harm from the emergency of each of the different spaces and/or egress paths that the individual may utilize based on the positioning of the numerous access control devices 302.

Access control device 302 may receive data from any type of component included in access control device 302. For example, sensors included in a locking mechanism may send data to access control device 302 indicating that a person has departed from the door after the door closed behind the person. Access control device 302 may then instruct the door latch to extend thereby locking the door. Access control device 302 may receive data from any type of component included in access control device 302 that includes but is not limited to sensors, credential readers, biometric sensing devices, user interface devices, and/or any other component that may provide data to access control device 302 to adequately instruct access control device 302 to execute actions to regulate access to the space that will be apparent to those skilled in the relevant art(s) without departing from the spirit and scope of the disclosure.

Controller 120 of beacon 110 may incorporate the data captured by each of the components included in access control device 302 to generate updated emergency information that is provided to the individual based on the data captured by each of the components included in access control device 302. For example, controller 120 may determine the identity of specific individuals that have accessed the space that is controlled by access control device 302 based on the data provided by the credential reader included in access control device 302. In order for the individuals to have obtained access to the space controlled by access control device 302, each of the individuals had to swipe their credential card with the credential reader and had to have been granted authorization to enter the space based on the identification of the individual provided by the credential card. Controller 120 may then provide the quantity of individuals located in the space as well as the identity of the individuals such that emergency responders may be aware of the location of those individuals in the space based on the data captured by the credential reader included in access control device 302.

Access control device 302 may communicate with management server 306 over a Wi-Fi connection and/or with communications device 130 over a Bluetooth connection. Additionally, access control device 302 may communicate with management server 306 and/or the access control panel 310 via network 150. As such, it should be appreciated that access control device 302 may communicate with management server 306 via an online mode with a persistent real-time communication connection or via an offline mode (e.g., periodically or in response to an appropriate condition) depending on the particular embodiment. As indicated above, in other embodiments, it should be appreciated that the access control device 302 may communicate with the devices of management server 306 via another suitable communication protocol. It should be appreciated that the various devices of the management system may communicate with one another and/or other devices via any suitable wired and/or wireless communication technologies depending on the particular embodiment.

Further, management server 306 may communicate with multiple access control devices 302 at a single site (e.g., a particular building) and/or across multiple sites. That is, in such embodiments, the management server 306 may be configured to receive data from access control devices 302 distributed across a single building, multiple buildings on a single campus, or across multiple locations.

Management server 306 may be configured to manage credentials of emergency information generating system 300. For example, management server 306 may be responsible for ensuring that access control device 302 has updated authorized credentials, whitelists, blacklists, device parameters, and/or other suitable data. Similarly, in some embodiments, management server 306 may be responsible for registering communications devices 130 with emergency information generating system 300 and distributing appropriate credentials to communications device 130 for authorized access to access control device 130. Additionally, management server 306 may receive security data, audit data, raw sensor data, and/or other suitable data from access control device 302 for management of emergency information generating system 300. Management server 306 may be embodied as an online server or a cloud-based server.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirit and scope of the present disclosure. Thus the present disclosure should not be limited by any of the above-described exemplary embodiments, but should be defined only in accordance with the following claims and their equivalents.

What is claimed is:

1. A system for communicating emergency information relative to a structure to an individual associated with the structure, comprising:
   a beacon configured to:
     transmit emergency information via a first byte code included in a first packet of emergency information to a communications device associated with the individual, wherein the emergency information includes emergency status information that updates the individual as to a status of an emergency that the structure is enduring and/or emergency action information that provides recommended actions for the individual to execute to avoid harm caused by the emergency, and
     transmit default emergency information via a second byte code included in the first packet of the emergency information associated with the transmitted emergency information to the communications device, wherein the default emergency information provides additional information related to the emergency that the structure is enduring to the individual; and
   a controller configured to:
     update the emergency information via a first byte code in a second packet of emergency information that is transmitted by the beacon based on changes in status information due to changes in the status of the emergency that the structure is enduring and/or changes in the emergency action information due to changes in the recommended actions that the individual is to execute based on changes in the status information of the emergency, and
     maintain the default emergency information via a second byte code included in the second packet of the emergency information to maintain the additional information provided to the communications device via the second byte code included in the second packet as to the second byte code included in the first packet thereby enabling the communications device to provide the default emergency information to the individual when the communication device is unable to access an emergency server to receive updated emergency information stored in the emergency server via the first byte of the second packet of the emergency information.

2. The system of claim 1, wherein the controller is further configured to:
   generate detailed emergency information and provide the detailed emergency information to the emergency server, wherein the detailed emergency information provides additional information associated with the status of the emergency that the structure is enduring and/or additional information associated with the recommended actions for the individual to execute to avoid harm caused by the emergency that is in addition to the emergency information transmitted by the beacon.

3. The system of claim 2, wherein the beacon is further configured to:

transmit a prompt included in the emergency information transmitted to the communications device that requests the individual to provide individual emergency status information to the emergency server via the communications device, wherein the individual emergency status information is status information associated with the individual as the individual endures the emergency that the structure is enduring.

4. A method for communicating emergency information relative to a structure to an individual associated with the structure, comprising:

transmitting, by a beacon, emergency information via a first byte code included in a first packet of emergency information to a communications device associated with the individual, wherein the emergency information includes emergency status information that updates the individual as to a status of an emergency that the structure is enduring and/or emergency action information that provides recommended actions for the individual to execute to avoid harm caused by the emergency;

transmitting default emergency information via a second byte code included in the first packet of the emergency information associated with the transmitted emergency information to the communications device, wherein the default emergency information provides additional information related to the emergency that the structure is enduring to the individual;

updating the emergency information via a first byte code in a second packet of emergency information that is transmitted by the beacon based on changes in the status information due to changes in the status of the emergency that the structure is enduring and/or changes in the emergency action information due to changes in the recommended actions that the individual is to execute based on changes in the status information of the emergency; and maintaining the default emergency information via a second byte code included in the second packet of the emergency information to maintain the additional information provided to the communications device via the second byte code included in the second packet as to the second byte code included in the first packet thereby enabling the communications device to provide the default emergency information to the individual when the communication device is unable to access an emergency server to receive updated emergency information stored in the emergency server via the first byte of the second packet of the emergency information.

5. The method of claim 4, further comprising:

generating detailed emergency information and providing the detailed emergency information to the emergency server, wherein the detailed emergency information provides additional information associated with the status of the emergency that the structure is enduring and/or additional information associated with the recommended actions for the individual to execute to avoid harm caused by the emergency that is in addition to the emergency information transmitted by the beacon.

6. The method of claim 5, further comprising:

transmitting a prompt included in the emergency information transmitted to the communications device that requests the individual to provide individual emergency status information to the emergency server via the communications device, wherein the individual status information is status information associated with the individual as the individual endures the emergency that the structure is enduring.

7. A system for communicating emergency information relative to a structure, comprising:

a communications device associated with an individual associated with the structure, the communications device configured to:

receive emergency information via a first byte code included in a first packet of emergency information from a beacon associated with the structure, wherein the emergency information includes emergency status information that updates the individual as to a status of an emergency that the structure is enduring and/or emergency action information that provides recommended actions for the individual to execute to avoid harm caused by the emergency, and receive default emergency information via a second byte code included in the first packet of the emergency information associated with the transmitted emergency information to the communications device, wherein the default emergency information provides additional information related to the emergency that the structure is enduring to the individual; and a controller configured to:

query an emergency server to obtain detailed emergency information via a first byte code in a second packet of emergency information, wherein the detailed emergency information provides additional information associated with the status of the emergency that the structure is enduring and/or additional information associated with the recommended actions for the individual to execute to avoid harm caused by the emergency that is in addition to the emergency information received from the beacon, and maintain the default emergency information via a second byte code included in the second packet of the emergency information to maintain the additional information provided by the beacon via the second byte code included in the second packet as to the second byte code included in the first packet thereby enabling the communications device to provide the default emergency information to the individual when the communications device is unable to access the emergency server to receive updated emergency information stored in the emergency server via the first byte of the second packet of the emergency information.

8. The system of claim 7, wherein the controller is further configured to:

generate individual emergency status information that is transmitted to the emergency server via the communications device, wherein the individual emergency status information is status information associated with the individual as the individual endures the emergency that the structure is enduring.

9. The system of claim 8, wherein the controller is further configured to:

determine a location for the individual to relocate to avoid harm caused by the emergency endured by the structure based on the emergency information received from the beacon and the detailed emergency information obtained from the emergency server; and provide directional feedback to the individual via the communications device as to a route that the individual is executing regarding how the individual is progressing towards arriving at the determined location for the individual to relocate to avoid harm caused by the emergency.

10. The system of claim 9, wherein the communications device is further configured to:
receive a plurality of location signals generated by a plurality of beacons associated with the structure, wherein each of the location signals provide a corresponding transmit power level to the communications device that is relative to a corresponding distance from the communications device that each beacon is located.

11. The system of claim 10, wherein the controller is further configured to:
assess each of the transmit power levels provided by each of the location signals received from the each of the corresponding beacons;
determine a direction and distance of each beacon relative to a location of the communications device based on each of the transmit power levels provided by each of the corresponding location signals;
generate an estimated location of the communications device relative to the structure based on each of the location signals generated by each of the corresponding beacons; and
update the estimate location of the communications device as the location of the communications device changes relative to each of the beacons associated with the structure based on each adjusted transmit power level provided by each of the location signals.

12. A method for communicating emergency information relative to a structure between a beacon associated with the structure and an individual that is associated with the structure, comprising:
receiving, by a communications device that is associated with the individual, the emergency information via a first byte code included in a first packet of emergency information from the beacon associated with the structure, wherein the emergency information includes emergency status information that updates the individual as to a status of an emergency that the structure is enduring and/or emergency action information that provides recommended actions for the individual to execute to avoid harm caused by the emergency;
receiving default emergency information via a second byte code included in the first packet of the emergency information associated with the transmitted emergency information to the communications device, wherein the default emergency information provides additional information related to the emergency that the structure is enduring to the individual;
querying an emergency server to obtain detailed emergency information via a first byte code in a second packet of emergency information, wherein the detailed emergency information provides additional information associated with the status of the emergency that the structure is enduring and/or additional information associated with the recommended actions for the individual to execute to avoid harm caused by the emergency that is in addition to the emergency information received from the beacon; and
maintaining the default emergency information via a second byte code included in the second packet of the emergency information to maintain the additional information provided by the beacon via the second byte code included in the second packet as to the second byte code included in the first packet thereby enabling the communications device to provide the default emergency information to the individual when the communications device is unable to access the emergency server to receive updated emergency information stored in the emergency server via the first byte of the second packet of the emergency information.

13. The method of claim 12, further comprising:
generating individual emergency status information that is transmitted to the emergency server via the communications device, wherein the individual emergency status information is status information associated with the individual as the individual endures the emergency that the structure is enduring.

14. The method of claim 13, further comprising:
determining a location for the individual to relocate to avoid harm caused by the emergency endured by the structure based on the emergency information received from the beacon and the detailed emergency information obtained from the emergency server; and
providing directional feedback to the individual via the communications device as to a route that the individual is executing regarding how the individual is progressing towards arriving at the determined location for the individual to relocate to avoid harm caused by the emergency.

15. The method of claim 14, further comprising:
receiving a plurality of location signals generated by a plurality of beacons associated with the structure, wherein each of the location signals provides a corresponding transmit power level to the communications device that is relative to a corresponding distance from the communications device that each beacon is located.

16. The method of claim 15, further comprising:
assessing each of the transmit power levels provided by each of the location signals received from each of the corresponding beacons;
determining a direction and distance of each beacon relative to a location of the communications device based on each of the transmit power levels provided by each of the corresponding location signals;
generating an estimated location of the communications device relative to the structure based on each of the locations signals generated by each of the corresponding beacons; and
updating the estimated location of the communications device as the location of the communications device changes relative to each of the beacons associated with the structure based on each adjusted transmit power level provide by each of the location signals.

17. A system for communicating emergency information relative to an individual associated with the structure, comprising:
an access control device is configured to execute an action to regulate access to a space include in the structure;
at least one component associated with the access control device that is configured to detect data associated with the space included in the structure;
a beacon associated with the access control device that is configured to:
transmit emergency information via a first byte code included in a first packet of emergency information to a communications device associated with the individual, wherein the emergency information includes emergency status information that updates the individual as to a status of an emergency that the structure is enduring and/or emergency action information that provides recommended actions for the individual to execute to avoid harm caused by the emergency, and transmit default emergency information via a second byte code included in the first packet of the emergency information associated with the transmitted emergency information to the communications device, wherein the default emergency information provides additional information related to the emergency that the structure is enduring to the individual, a controller configured to:

instruct the access control device to execute the action based on the data detected by the at least one component to regulate the space, update the emergency information via a first byte code in a second packet of emergency information that is transmitted by the beacon based on changes in the status information due to changes in the status of the emergency that the structure is enduring and/or changes in the emergency action information due to changes in the recommended actions that the individual is to execute based on changes in the status information of the emergency, and maintain the default emergency information via a second byte code included in the second byte code included in the second packet of the emergency information to maintain the additional information provided to the communications device via the second byte code included in the second packet as to the second byte code included in the first packet thereby enabling the communications device to provide the default emergency information to the individual when the communication device is unable to access an emergency server to receive updated emergency information stored in the emergency server via the first byte of the second packet of the emergency information.

18. The system of claim 17, wherein the controller is further configured to:

analyze the data detected by the at least one component to determine an instruction to provide to the access control device to execute in regulating access to the space; and update the communications device as to a status of the access control device based on the instruction provided to the access control device to execute in regulating access to the space.

19. The system of claim 18, wherein the controller is further configured to:

transition the beacon from transmitting a first packet of information to transmitting a second packet of emergency information to the communications device associated with the individual when information initially conveyed in the first packet to the communications device is changed due to a change in the emergency information associated with the structure, wherein the transition from the first packet of information to transmitting the second packet of emergency information updates the individual as to the status of the emergency that the structure is enduring and/or the emergency action information recommended for the individual via the communications device.

20. The system of claim 19, wherein the controller is further configured to wirelessly communicate with the access control device and the at least one component and the communications device.

21. The system of claim 20, wherein the controller is further configured to:

generate detailed emergency information and provide the detailed emergency information to the emergency server, wherein the detailed emergency information provides additional information associated with the status of the emergency that the structure is enduring and/or additional information associated with the recommended actions for the individual to execute to avoid harm caused by the emergency that is in addition to the emergency information transmitted by the beacon.

* * * * *